Patented Jan. 26, 1937

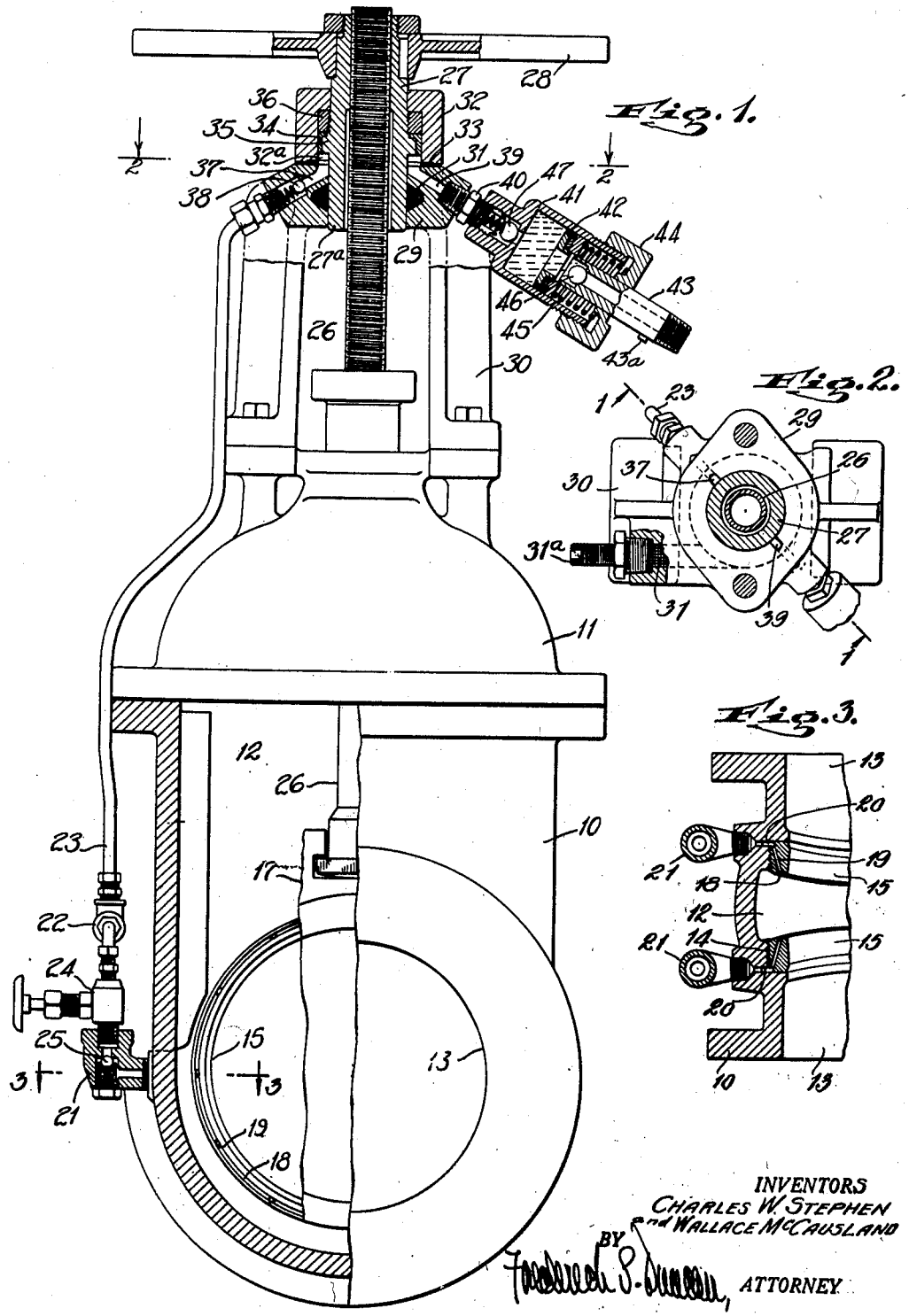

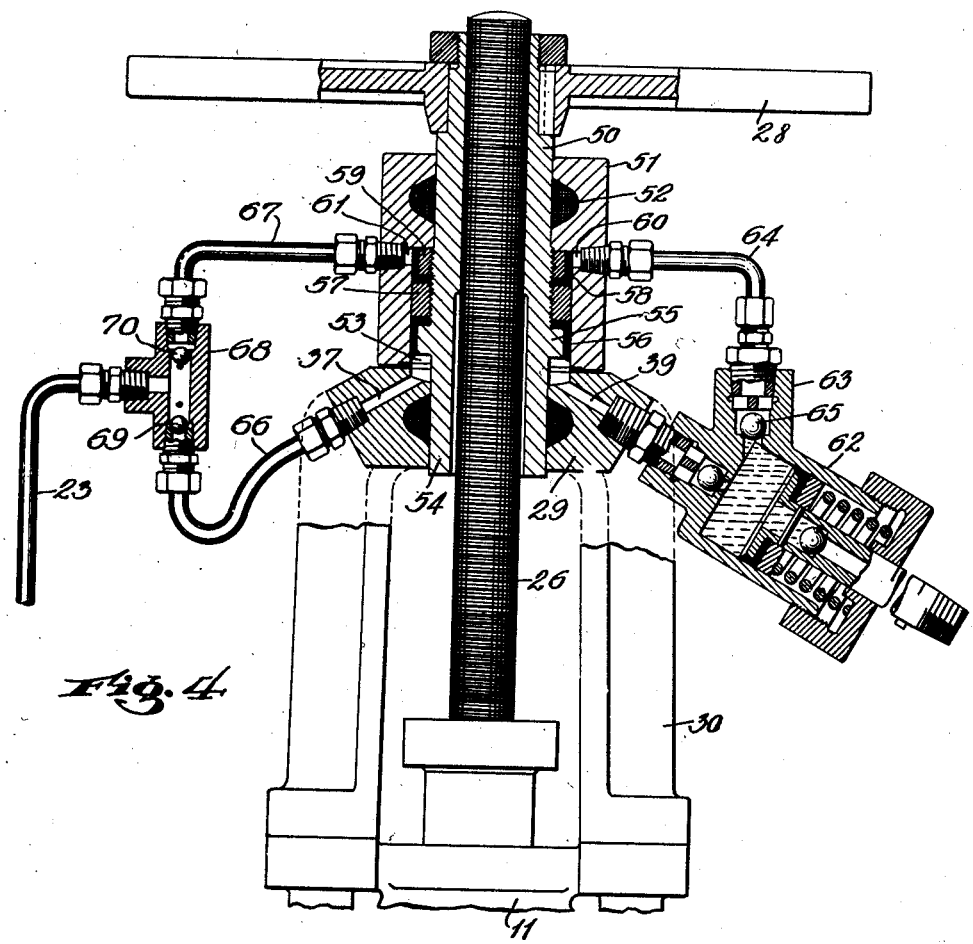

2,068,810

UNITED STATES PATENT OFFICE 2,068,810

LUBRICATED VALVE

Wallace McCausland and Charles W. Stephen, Bridgeport, Conn., assignors to Reading-Pratt & Cady Company, Inc., a corporation of New York Application April 8, 1931, Serial No. 528,568

12 Claims. (Cl. 251—20)

The present invention relates to valves of the type having means for forcing lubricant between the seating surfaces thereof so as to overcome binding and wear, as well as to provide a more effective seal between said surfaces.

An object of the present invention is to provide a valve with means for automatically forcing lubricant between the seating surfaces.

In a copending application Serial No. 528,565, filed April 8, 1931, the generic invention of an automatically lubricated valve is disclosed. Said application also covers specifically a valve of rotary plug type provided with automatic lubrication. An object of the present invention is to provide a valve with a novel form of automatic pump for forcing lubricant to the valve seat. The present invention will be found particularly useful in valves of the type in which the closure member instead of being rotated is bodily displaced with respect to the valve seat.

In another copending application, Serial No. 471,449, filed July 29, 1930, and now Patent No. 2,006,715, granted July 2, 1935, is disclosed a gate valve provided with channeled seats and with manually operable means for forcing lubricant between the gate and the seats either to overcome binding of the gate in its seat or to effect a seal therebetween.

A specific object of the present invention is to provide a gate valve with a lubricant pump operable in timed relation to the operation of the gate.

Another object is to provide a valve with common operating means for operating the pump and for raising and lowering the gate.

Another object is to provide means whereby the pump may be operated while the gate remains seated.

Other objects and advantages will appear in the following description of certain embodiments of the invention and thereafter the novelty and scope of the invention will be pointed out in the claims.

In the accompanying drawings:

Figure 1 is a view in side elevation of the improved gate valve, certain portions thereof being broken away and the upper part of the valve being shown in section taken substantially on the line 1—1 of Fig. 2;

Fig. 2 is a view in transverse section taken on the line 2—2 of Fig. 1;

Fig. 3 is a fragmental transverse section taken substantially on the line 3—3 of Fig. 1, with the gate removed; and Fig. 4 is a fragmental view, in vertical section, of a double acting lubricant pump applied to a gate valve.

The casing of the valve comprises a body portion 10 and a bonnet portion 11. The body portion is formed with a central chamber 12 into which lead a pair of opposed fluid passages 13. In the chamber at the mouth of each of said passages there is a threaded recess 14 to receive a seat ring 15. These seat rings are disposed at an acute angle to each other to receive a wedge type gate 17. Each seat ring is formed with a groove 18 in the gate-engaging face thereof and ducts 19 lead from the groove to an annular chamber 20 formed between the ring and the recess. A pipe fitting 21 communicates with each chamber 20 and the two pipe fittings communicate through a T-fitting 22 to a feed pipe 23. Between each fitting 21 and the T-fitting 22 a hand valve 24 is provided so that either one of the chambers 20 may be cut off from the feed pipe 23. Also in each fitting 21 there is a check valve 25 opening toward the chamber 20.

The gate 17 is provided with a valve stem 26 which passes through a suitable stuffing box, not shown, in the bonnet 11. The stem 26 is threaded at its upper end to engage a nut 27 on which a hand wheel 28 is secured. The nut 27 has a sleeve extension 27a which rotates in a suitable bearing 29 carried by a yoke-shaped bracket 30 secured to the bonnet 11. The bearing 29 is chambered to receive packing material 31 which bears against the body of the nut 27. The packing material is compressed by a tangential set screw 31a, Fig. 2. A cup-shaped cap member 32 is bolted or otherwise secured to the bearing member 29 and is formed with an aperture through which the nut 27 passes.

The cup-shaped member constitutes a cylinder in the working chamber 32a of which a plunger carried by the sleeve 27a operates, and in order to seal the joint between the cylinder member 32 and the bearing member 29, a gasket 33 is interposed between said members. The plunger consists of a cup leather 34 supported on a flange 35 of the sleeve 27a and is clamped against said flange by means of a collar 36 threaded upon the sleeve. The flange 35 limits movement of the nut in downward direction and the collar 36 limits movement thereof in the upward direction.

It will now be evident that when the hand wheel 28 is rotated to raise the gate 17, the nut 27 will be screwed downward upon the stem 26 until the flange 35 strikes the bearing 29, and thereafter further rotation of the nut will result in raising of the gate 17. When the hand wheel 28 is turned in the opposite direction, the nut will rise to the position shown in Fig. 1 before it can exert any considerable degree of downward pressure upon the gate 17. The movement of the plunger in the cap or cylinder 32 is utilized to pump lubricant through the pipe 23 to the seat grooves 18 in the seat rings 15.

The pipe 23 is coupled to the bearing member 29 and communicates with a passage 37 that opens through the upper face of the member 29 into the chamber 32a. A check valve 38 in the passage 37 opens outward toward the feed pipe 23. Lubricant is supplied to the chamber 32a through a passage 39. A nipple 40 is threaded into this passage and carries a cup 41. In this cup a plunger 42 is fitted to slide. This plunger has a hollow stem 43 which projects through a cap 44 closing the outer end of the cup 41. A spring 45 is interposed between the plunger 42 and the cap 44 and exerts pressure on the lubricant in the cup 41. A stop pin 43a on the stem 43 is adapted to strike the cap 44 to limit the extent to which the plunger 42 may move into the cup and also serves to indicate the amount of lubricant in the cup. In the hollow stem 43 there is a check valve 46 operating to prevent lubricant from flowing out of the cylinder 41 through the stem 43. Another check valve 47 at the opposite end of the cylinder 41 opens toward the passage 39.

In operation, with the parts in the position shown in Fig. 1, a supply of lubricant is forced into the cylinder 41 and thence by way of pipe 23 to the seat rings 15. The spring 45 serves to maintain a predetermined degree of pressure upon the lubricant. When the valve gate 17 is forced to closed position the plunger 34 will be in the raised position shown in Fig. 1, permitting lubricant from the cylinder 41 to enter the cylinder chamber 32a and pass thence into the pipe 23. However the pressure on this lubricant will be only that which is given by the spring 45. Now when it is desired to open the valve the hand wheel 28 is turned, forcing the plunger 34 downward and thereby forcing lubricant out of the cylinder 32 into the pipe 23 and thence to the seat rings of the valve. The lubricant cannot pass back into the chamber 41 because of the check valve 47. If sufficient pressure has not been introduced to free the gate from the seats by the first turn of the wheel 28, it is evident that the wheel may be oscillated back and forth producing a pumping action on the plunger 34 which at each upward stroke will draw lubricant from the cylinder 41 and on each downward stroke will force said lubricant to the seat rings. By this means, a very powerful fluid pressure may be exerted against the gate 17 which, owing to the wedge form of the gate, will produce a lifting effect, tending to free the gate from its seat. It will be noted that normally when the gate is raised the flange 35 will close the passages 37 and 39 preventing loss of lubricant from the cylinder 41.

When closing the valve the gate is brought solidly to its seat without pumping any lubricant thereto. In order to effect a seal the wheel 28 must be backed off and then turned forward again so as to pump lubricant to the seat. Sufficient back lash is provided to permit of oscillating the wheel through a fraction of a turn without raising the valve from its seat. In cases of leakage, however, it is preferable to provide means for pumping lubricant to the seat while the wheel is being turned in closing direction. The lubricant would then be pumped at the same time that the wheel is tending to drive the gate home. A means for obtaining such an effect is illustrated in Fig. 4, wherein a double acting pump is shown.

The double acting pump may be applied to the valve without any change in the latter. However, instead of the nut 27, a longer nut 50 is used, and instead of the cap 32, a longer cap 51 is used. The latter is formed near its upper end with an internal annular recess to receive packing material 52. Below the recess is the working chamber 53 of the pump. A double acting pump plunger is formed on the nut 51 and a sleeve extension 54 of the nut. Fitted upon an annular flange 55 formed on said extension is a downwardly directed cup leather 56 which is clamped in place by a collar 57 threaded on said extension. A second cup leather 58 which is upwardly directed is clamped between the collar 57 and another collar 59 threaded on the nut 50.

As in the construction shown in Fig. 1, the cap 51 is clamped to the head 59 of the yoke 30 and said head is formed on one side with an inlet port 39 and on the other with an outlet port 37. Another inlet port 60 and another outlet port 61 open into the upper end of the working chamber and respectively at opposite sides thereof. Lubricant is supplied to the ports 39 and 60 from a cup 62 which differs from the cup 41 in having a lateral branch 63 connected to the port 60 by a pipe 64. Within the cup 62 is a spring-pressed plunger of the same type as that in the cup 41. A ball check valve 65 in the branch 63 opens toward the port 60.

A pair of pipes 66 and 67 connect the ports 37 and 61 respectively with the opposite ends of a T-fitting 68 coupled to the pipe 23. Ball check valves 69 and 70 open toward the pipe 23 from the pipes 66 and 67 respectively.

With this double acting pump lubricant is pumped when the wheel 28 is turned in either direction. Thus, when the valve is moved to closed position, if further lubricant is necessary, the wheel can be backed off to force a certain amount of lubricant to the seat and then the wheel is turned to closing position, pumping still more lubricant and simultaneously forcing the gate more tightly against its seat. On the other hand when the valve is closed the opening thereof is facilitated, because lubricant is forced to the seating surfaces when the wheel 28 is turned in opening direction and the lubricant exerts a substantial lifting effect.

We have described our invention as applied to a gate valve, but it is also applicable to other types of valves as well. It will be understood, therefore, that the embodiments described are to be taken as illustrative and not limitative of our invention and that we are free to make such changes in form, construction and general arrangement as fall within the spirit and scope of the following claims.

We claim:

1. A gate valve comprising a body, a gate slidable therein, the body and gate being formed with coacting seating surfaces, a non-rotary stem connected to the gate, a pump adapted to force lubricant to said seating surfaces and comprising a cylinder member and a plunger member having limited relative axial movement therein, one of said members being fixed and the other member having threaded connection with the stem, and means for rotating the latter member to operate the pump and slide the gate.

2. A gate valve comprising a body, a gate slidable therein, the body and gate being formed with coacting seating surfaces, a non-rotary stem connected to the gate, a pump adapted to force lubricant to said seating surfaces and comprising a cylinder fixed to the body and a plunger having limited axial movement therein and threaded upon said stem, and means for rotating the plunger.

3. A gate valve comprising a body formed with a valve seat, a gate slidable toward and from said seat, a non-rotary stem connected to the gate, a fixed pump cylinder, means for supplying lubricant thereto, an outlet conduit leading from the cylinder to said seat, a plunger having limited axial movement in the cylinder and threaded upon the stem, and means for rotating the plunger.

4. A gate valve comprising a body formed with a valve seat, a gate movable toward and from said seat, a non-rotary stem connected to the gate, a fixed pump cylinder having an inlet port and an outlet port, a reservoir for lubricant connected to the inlet port, a conduit leading from the outlet port to said seat, a plunger having limited axial movement in the cylinder and threaded upon the stem, and means for rotating the plunger to move the gate with respect to said seat and to pump lubricant to said seat, said plunger being adapted to close one of said ports while the gate is being moved away from said seats.

5. A gate valve comprising a body formed with a valve seat, a gate movable toward and from said seat, a non-rotary stem connected to the gate, a fixed pump cylinder having an inlet port and an outlet port, a reservoir for lubricant connected to the inlet port, a conduit leading from the outlet port to said seat, a plunger having limited axial movement in the cylinder and threaded upon the stem, means for rotating the plunger to move the gate with respect to said seat and to pump lubricant to said seat, and a check valve in the conduit opening toward the seat.

6. A gate valve comprising a body formed with a valve seat, a gate movable toward and from said seat, a non-rotary stem connected to the gate, a fixed pump cylinder having an inlet port and an outlet port, a reservoir for lubricant connected to the inlet port, a conduit leading from the outlet port to said seat, a plunger having limited axial movement in the cylinder and threaded upon the stem, means for rotating the plunger to move the gate with respect to said seat and to pump lubricant to said seat, a check valve in the conduit opening toward the seat, and a check valve in the reservoir opening toward the cylinder.

7. A gate valve comprising a body formed with a valve seat, a gate movable toward and from said seat, a non-rotary stem connected to the gate, a fixed pump cylinder having an inlet port and an outlet port, a reservoir for lubricant connected to the inlet port, a conduit leading from the outlet port to said seat, a plunger having limited axial movement in the cylinder and threaded upon the stem, means for rotating the plunger to move the gate with respect to said seat and to pump lubricant to said seat, and means for exerting pressure on the lubricant in the reservoir.

8. A gate valve comprising a body formed with a valve seat, a gate movable toward and from said seat, a non-rotary stem connected to the gate, a fixed pump cylinder having an inlet port and an outlet port, a reservoir for lubricant connected to the inlet port, a conduit leading from the outlet port to said seat, a plunger having limited axial movement in the cylinder and threaded upon the stem, means for rotating the plunger, a check-valve in the conduit opening toward the seat, a check valve in the reservoir opening toward the cylinder, and means for exerting pressure on the lubricant in the reservoir.

9. A gate valve comprising a body formed with a valve seat, a gate movable toward and from said seat, a non-rotary stem connected to the gate, a fixed pump cylinder having an inlet port and an outlet port, a reservoir for lubricant connected to the inlet port, a conduit leading from the outlet port to said seat, a plunger having limited axial movement in the cylinder and threaded upon the stem, means for rotating the plunger, a check valve in the conduit opening toward the seat, a check valve in the reservoir opening toward the cylinder, a spring pressed plunger in the reservoir for exerting pressure on the lubricant therein, the latter plunger being formed with a hollow stem to admit lubricant into the reservoir, and a check valve in said hollow stem opening toward the reservoir.

10. A gate valve comprising a body formed with a valve seat, a gate movable toward and from said seat, a non-rotary stem connected to the gate, a fixed pump cylinder having an inlet port and an outlet port, a reservoir for lubricant connected to the inlet port, a conduit leading from the outlet port to said seat, a plunger having limited axial movement in the cylinder and threaded upon the stem, means for rotating the plunger, a spring pressed plunger in the reservoir for exerting pressure on the lubricant therein, the latter plunger being formed with a hollow stem to admit lubricant into the reservoir, a check valve in said stem opening toward the reservoir, and means on the stem for indicating the amount of lubricant in reservoir.

11. A gate valve comprising a body formed with a valve seat, a gate movable toward and from said seat, a non-rotary stem connected to the gate, a nut threaded on the stem, a cylinder through which the nut passes, a plunger carried by the nut and fitting the cylinder, the cylinder being formed with opposed thrust surfaces limiting axial movement of the plunger therein, the lower one of said surfaces being formed with an intake port and an outlet port, means for supplying lubricant to the intake port, a conduit leading from the outlet port to the seat, and means for rotating the nut, the plunger being adapted to close communication between the inlet and outlet ports when the nut is bearing against the lower thrust surface to move the gate away from the seat.

12. A gate valve comprising a body formed with a fluid passage, a gate slidable in the body to control the passage, a gate actuating device operable in one direction to open the passage and in the other to close the same, and a double acting pump controlled by movement of the device in either direction to force lubricant between the body and the gate.

WALLACE McCAUSLAND.
CHARLES W. STEPHEN.